B. CHRISTENSEN.
SELF STARTER.
APPLICATION FILED DEC. 1, 1913.
1,123,846.
Patented Jan. 5, 1915.
2 SHEETS—SHEET 1.
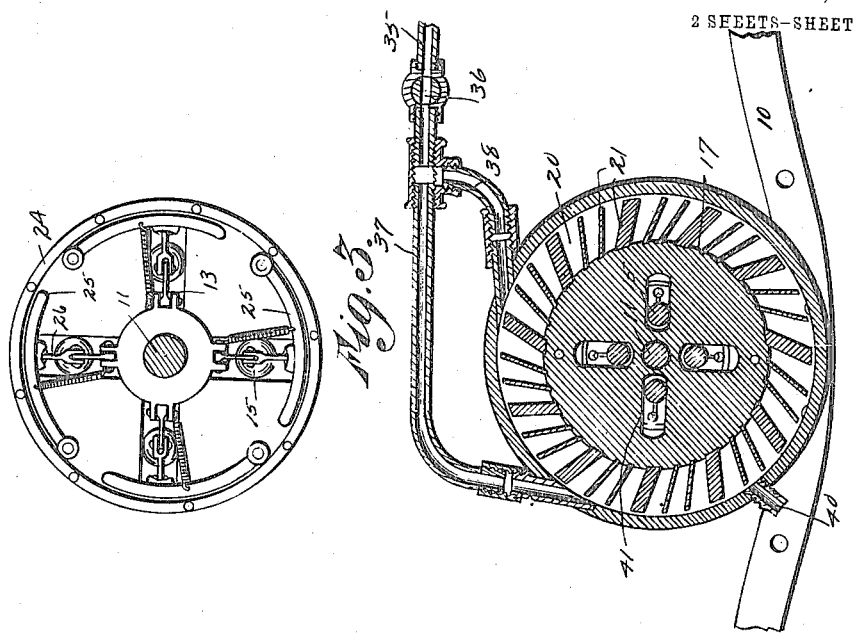
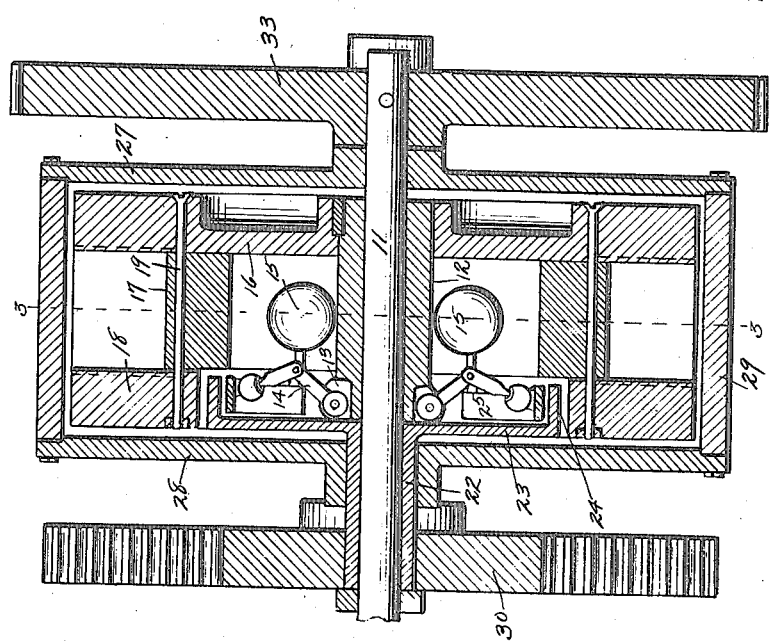

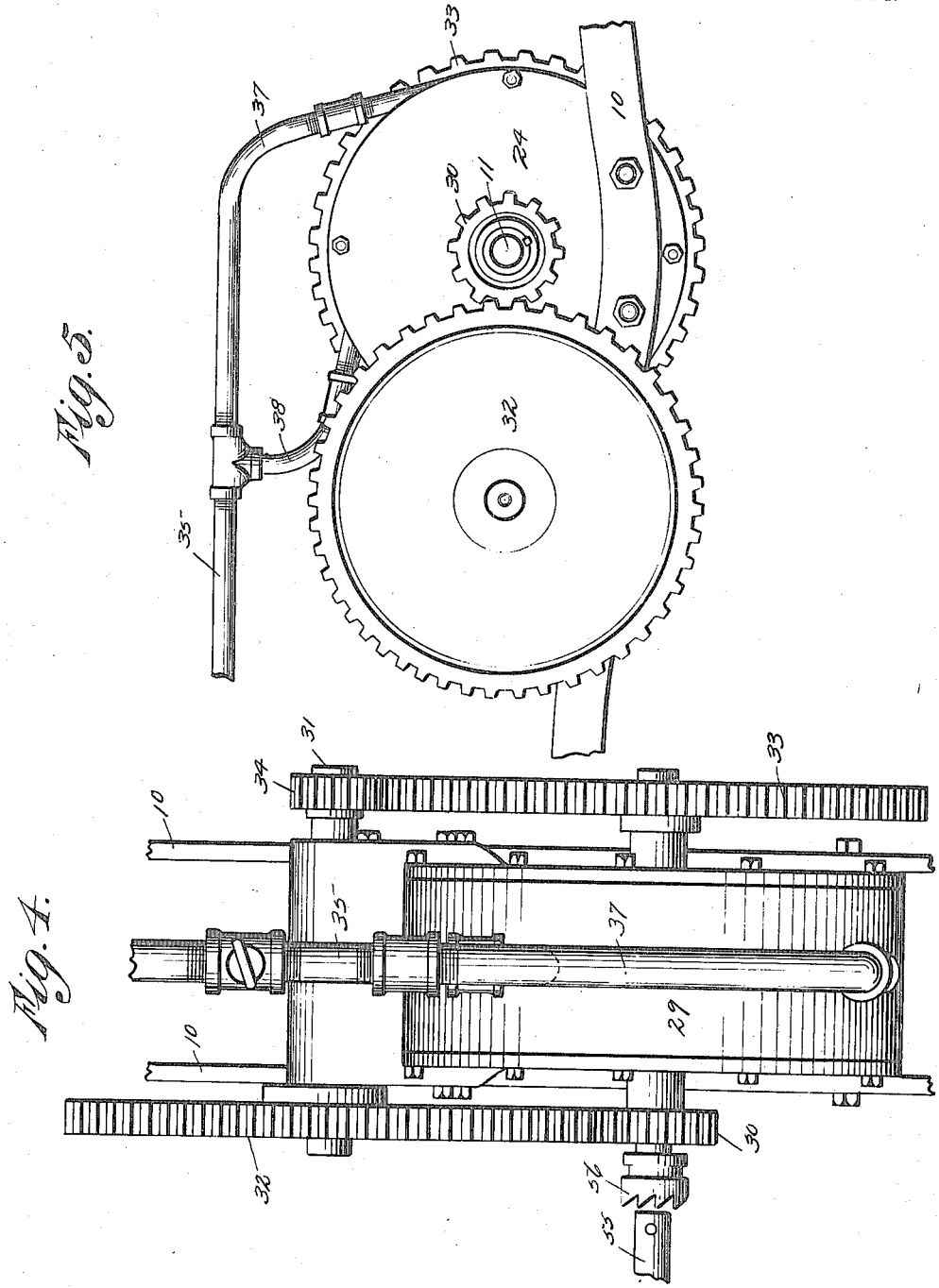

UNITED STATES PATENT OFFICE.

BARNEY CHRISTENSEN, OF SLATER, IOWA, ASSIGNOR OF ONE-HALF TO W. H. KEIGLEY, OF MADRID, IOWA.

SELF-STARTER.

1,123,846.

Specification of Letters Patent.

Patented Jan. 5, 1915.

Application filed December 1, 1913. Serial No. 804,125.

*To all whom it may concern:*

Be it known that I, BARNEY CHRISTENSEN, a citizen of the United States, and resident of Slater, in the county of Story and State of Iowa, have invented a certain new and useful Self-Starter, of which the following is a specification.

The object of my invention is to provide a self starter of simple, durable and inexpensive construction, adapted for use with internal combustion engines, particularly those used on automobiles.

More particularly, it is my object to provide a self starter of the kind mentioned in which compressed air is used for imparting considerable speed to a comparatively heavy fly wheel and friction shoes or similar devices are employed for suddenly throwing the fly wheel into gear with the engine shaft.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a central, vertical, longitudinal, sectional view through a self starting mechanism, embodying my invention. Fig. 2 shows a rear elevation of the mechanism which carries the friction shoes and ball governor, the central shaft being shown in section and the other parts removed. Fig. 3 shows a transverse, vertical, sectional view, taken on the line 3—3 of Fig. 1 and showing the air supply pipes which are not shown in Fig. 1. Fig. 4 shows a top or plan view of my self starter, and Fig. 5 shows a rear elevation of the same.

In the accompanying drawings I have used the reference numeral 10 to indicate part of the frame on which my improved self starter is supported.

The reference numeral 11 is used to indicate a shaft suitably mounted on the frame of the vehicle or the like. On the shaft 11 is mounted a sleeve 12, near one end of which, at regular intervals, are four pairs of parallel ears 13. Pivoted between each pair of ears is one arm of a bell crank lever 14. Secured to the other end of each bell crank lever 14 is a heavy ball 15. Fixed to the sleeve 12, at the end opposite the ears 13 is an annular disk 16. Resting against the side of the disk 16, outside the balls 15 and leaving a space in which the balls 15 may play, is an annular rim or ring 17. Resting against the side of the rim 17, opposite the disk 16, is an annular ring 18 which is arranged parallel with the outer portion of the disk 16, as shown in Fig. 1, and is firmly bolted to the rim or ring 17 and the disk 16 by means of bolts 19.

It will be seen that between the ring 18 and the outer portion of the disk 16 is an annular space or slot 20. Arranged in the slot 20, around the ring 17, are a plurality of inclined blades 21. Mounted on the shaft 12, adjacent to the end of the sleeve 12, on which the ears 13 are mounted, is a sleeve 22, formed on which, adjacent to the sleeve 12, is an annular disk 23, formed on the periphery of which is an annular rim 24, extending laterally toward the disk 16 and spaced inwardly from the ring 18.

A plurality of friction shoes 25 are pivoted at one end to the rim 24, as shown in Fig. 2. Pivoted to the center of each of the bell cranks 14 is a link 26, which is pivoted at its other end to one of the shoes 25. Rotatably mounted on the shaft 11, adjacent to the disk 16, is a casing member 27. Rotatably mounted on the sleeve 22, adjacent to the disk 23, is a similar casing member 28. The casing members 27 and 28 are connected at their peripheries by a rim or band 29.

It will be seen that the ball governor, hereinbefore described and the mechanism carrying the fan blades 21 are inclosed within a casing formed by the members 27, 28 and 29. Fixed on the sleeve 22, outside the casing just described, is a gear 30. Suitably mounted on the frame, outside the casing, above mentioned, is a shaft 31 parallel with the shaft 11. On the shaft 31 is a gear 32, in mesh with the gear 30. On the shaft 11, adjacent to the casing member 27 is a gear 33, which is in mesh with the gear 34 on the shaft 31.

The gears just described are for the purpose of gearing down so that a very rapid rotation of the gear 30 imposes a comparatively slower rotation upon the shaft 11. An air supply pipe 35 is designed to be connected with a suitable compressed air tank. In the pipe 35 is a controlling valve 36. The pipe 35, between the valve 36 and the casing hereinbefore described, divides into two branches 37 and 38. The branches 37 and 38 communicate with the interior of the casing through the member 29, as shown in Fig. 3. A discharge passage 40 from the casing is located substantially as shown in Fig. 3. The annular rim or ring 17 is mounted on the sleeve 12, connected with the disk 16, in the manner hereinbefore described, and is provided with a plurality of radial internal slots 41, in which the balls 15 travel and which serve as guides for said balls.

It should be understood that the shaft 11 is arranged in line with the engine shaft 55. Slidably but non-rotatably mounted on one end of the shaft 11 is a clutch 56, which may be thrown into operative relation with the shaft 55.

I shall now describe the practical operation of my improved self starter.

The clutch 56 is thrown into gear with the shaft 55. Assuming that the pipe 35 is connected with a suitable supply of compressed air, the valve 36 is moved to the position shown in Fig. 3. The air passing through the branches 37 and 38 strikes the plates 21 and imparts to the rim 17, the ring 18, the disk 16 and the sleeve 12 and ball governor, a very rapid rotation. On account of the fact that the sleeve 12 is rotatably mounted upon the shaft 11, said rotation is not immediately imparted to the sleeve 22 nor to the gear 30 fixed thereon. As the speed of the parts mentioned above increases, the links 26 and the arms of the bell crank levers 14, which are secured to the ears 13, approach toward the position where they are in substantial alinement. The friction shoes 25 are finally thrown suddenly into engagement with the rim 24 which will then operate the gears hereinbefore described for imparting motion to the shaft 11 and through it to the engine shaft.

Assuming that the spark is properly arranged and that fuel has been properly supplied, the engine will then be started in the ordinary way.

My device has a number of advantages in operation which may be partially seen from the foregoing description. I am enabled to use a very simple form of rotary fan so that with comparatively little power from the compressed air, it is possible to impart great speed to the fan and the parts connected therewith. The disk 16, the rim 17, the ring 18 and the parts carried thereby, are of considerable weight so that the parts just described serve as a fly wheel. The arrangement of the ball governor is such that when the fan has attained great speed it is suddenly thrown into engagement with the annular rim or flange 24 and the weight of the parts is sufficient to turn the engine over once or twice or even more times.

The parts are of comparatively simple construction and are so arranged that they will not readily get out of order. The gears 30 and 33 and the other parts mentioned on the shafts are so mounted that they may be readily taken off for making repairs or replacing worn or broken parts.

It will be understood that many changes may be made in the details of the construction of my device without departing from its essential features and it is my intention to cover by this application any such modified forms of construction which may be included within the scope of the appended claims.

I claim as my invention:

1. In a device of the class described, an engine shaft, a shaft, adjustable means for placing said shaft in operative relation with said engine shaft, a compressed air turbine rotatably mounted on said shaft, carrying a plurality of ball controlled friction shoes, a casing for said compressed air turbine, means for conducting compressed air to said compressed air turbine, a friction flange arranged to coöperate with said shoes, and a gearing device operatively connected with said flange and with said second shaft, said ball controlled friction shoes being arranged to be thrown suddenly into engagement with said friction flange when the turbine has reached a comparatively high speed.

2. In a device of the class described, a shaft, a sleeve rotatably mounted thereon, a turbine device carried by said sleeve, including blades mounted on said device, a casing for inclosing said device and said blades, means for conducting compressed air to said blades, a second sleeve, a disk formed thereon, a friction flange formed on said disk, friction shoes pivoted at one end to said flange, a plurality of bell crank levers pivoted to said first sleeve, a ball on the free end of each bell crank lever, a link pivoted to each bell crank lever and to one of said shoes, arranged to move to position substantially in alinement with the arms on the bell cranks which are secured to said first sleeve when said blades have reached a certain predetermined speed, said device on said sleeve being provided with chambers to receive said balls.

3. In a device of the class described, a shaft, a sleeve rotatably mounted thereon, a turbine device carried by said sleeve, including blades mounted on said device, a casing for inclosing said device and said blades, means for conducting compressed air to said blades, a second sleeve, a disk formed thereon, a friction flange formed on said disk, friction shoes pivoted at one end to said flange, a plurality of bell crank levers pivoted to said first sleeve, a ball on the free end of each bell crank lever, a link pivoted to each of said bell crank levers and to one of said shoes, arranged to move to position substantially in alinement with the arms on the bell cranks which are secured to said first sleeve when said blades have reached a certain predetermined speed, said turbine device on said sleeve being provided with chambers to receive said balls, and means for operatively connecting said sleeve with said shaft.

4. In a device of the class described, a shaft, a sleeve rotatably mounted thereon, a turbine device carried by said sleeve, including blades mounted on said device, a casing for inclosing said device and said blades, means for conducting compressed air to said blades, a second sleeve, a disk formed thereon, a friction flange formed on said disk, friction shoes pivoted at one end to said flange, a plurality of bell crank levers pivoted to said first sleeve, a ball on the free end of each bell crank lever, a link pivoted to each of said bell crank levers and to one of said shoes, arranged to move to position substantially in alinement with the arms on the bell cranks which are secured to said first sleeve when said blades have reached a certain predetermined speed, said device on said sleeve being provided with chambers to receive said balls, and means for operatively connecting said sleeve with said shaft, said means including a gearing device, whereby the speed imparted to the shaft is less than the speed of the turbine device.

Des Moines, Iowa, November 20, 1913.

BARNEY CHRISTENSEN.

Witnesses:
HARRY C. GRAVES,
B. FRISE.